United States Patent [19]

Bond et al.

[11] Patent Number: 4,979,191

[45] Date of Patent: Dec. 18, 1990

[54] AUTONOMOUS N-MODULAR REDUNDANT FAULT TOLERANT CLOCK SYSTEM

[75] Inventors: David G. Bond, Kent; Todd Hill, Tukwila; Paul D. Weis, Seattle; John R. Woods, Auburn, all of Wash.

[73] Assignee: The Boeing Company, Seattle, Wash.

[21] Appl. No.: 352,976

[22] Filed: May 17, 1989

[51] Int. Cl.$^5$ .............................................. H04L 7/00

[52] U.S. Cl. .................................... 375/108; 307/441

[58] Field of Search ................ 375/106, 108; 307/219, 307/269, 441; 328/63, 155; 371/36

[56] References Cited

U.S. PATENT DOCUMENTS

| | | | |
|---|---|---|---|
| 3,420,993 | 1/1969 | Chamberlain et al. | 235/184 |
| 3,522,455 | 8/1970 | Thomas et al. | 307/269 |
| 3,544,778 | 12/1970 | Masters | 235/153 |
| 3,555,290 | 1/1971 | Ellermeyer | 307/65 |
| 3,599,111 | 8/1971 | Butler et al. | 331/55 |
| 3,602,900 | 8/1971 | Deisigne | 340/172.5 |
| 3,900,741 | 8/1975 | Fletcher et al. | 307/204 |
| 3,940,736 | 2/1976 | Inaba et al. | 340/146.1 A |
| 4,096,396 | 6/1978 | Belforte et al. | 307/219 |
| 4,185,245 | 1/1980 | Fellinger et al. | 328/103 |
| 4,229,699 | 10/1980 | Frissell | 375/108 |
| 4,239,982 | 12/1980 | Smith et al. | 307/219 |
| 4,276,645 | 6/1981 | Lager et al. | 371/36 |
| 4,322,580 | 3/1982 | Khan et al. | 375/108 |
| 4,375,683 | 3/1983 | Wensley | 371/36 |
| 4,392,199 | 7/1983 | Schmitter et al. | 364/200 |
| 4,480,198 | 10/1984 | Gass | 307/269 |
| 4,600,845 | 7/1986 | McKenna, Jr. | 307/269 |
| 4,635,249 | 1/1987 | Bortolini et al. | 375/108 |
| 4,644,498 | 2/1987 | Bedard et al. | 364/900 |
| 4,651,103 | 3/1987 | Grimes | 307/269 |
| 4,683,570 | 7/1987 | Bedard et al. | 371/36 |
| 4,691,126 | 9/1987 | Splett et al. | 307/441 |
| 4,779,008 | 10/1988 | Kessels | 307/269 |

OTHER PUBLICATIONS

Davies et al., "Synchronization and Matching in Redundant Systems," *IEEE Transactions on Computers*, vol. C-27, No. 6, Jun. 1978, pp. 531-539.

Krishna et al., "Ensuring Fault Tolerance of Phase--Locked Clocks," *IEEE Transactions on Computers*, vol. C-34, No. 8, Aug. 1985, pp. 752-756.

Lamport et al., "The Byzantine Generals Problem," *ACM Transactions on Programming Languages and Systems*, vol. 4, No. 3, Jul. 1982, pp. 382-401.

Melliar-Smith et al., "Formal Specification and Mechanical Verification of SIFT: A Fault-Tolerant Flight Control System," *IEEE Transactions on Computers*, vol. C-31, No. 7, Jul. 1982, pp. 616-630.

Pease et al., "Reaching Agreement in the Presence of Faults," *Journal of the Association for Computing Machinery*, vol. 27, No. 2, Apr. 1980, pp. 228-234.

Smith, "Fault Tolerant Processor Concepts and Operation," C.S. Draper Laboratory, Inc. and United Technologies Mostek, pp. 158-163.

*Primary Examiner*—Benedict V. Safourek
*Assistant Examiner*—Stephen Chin
*Attorney, Agent, or Firm*—Christensen, O'Connor, Johnson & Kindness

[57] ABSTRACT

A fault tolerant clock system in which synchronization of the clocks continuing to operate after a fault occurs is maintained within a skew limit. The clock system includes a plurality of clock channels (10), each including a clock unit (12) and an isolation port (14). A local clock signal produced by a crystal oscillator (16) is enabled to provide a clock channel output signal while a counter (24) in the clock unit accumulates a predetermined number of local clock pulses. After the predetermined number is reached, the counter disables the clock channel output signal and produces a sync pulse, which is input to a voter block (48). In response to the second sync pulse to be received from each of the clock channels, each voter block produces a load pulse signal that is input to the isolation port of that clock channel. Corresponding isolated load signals are produced by the isolation port and provided to voter blocks (72) in each of the clock units. The voter blocks respond to the second isolated load signal to be received, producing a load enable signal that is input to the counter. Upon receipt of the load enable signal, the counter resumes counting and again enables the clock channel output signal, in synchronization with the other clock channel output signals. Up to N simultaneous faults may be sustained in the clock system, without loss of synchronization in the clock channels that continue to operate properly, so long as 2N+1 clock channels are provided.

25 Claims, 6 Drawing Sheets

AUTONOMOUS N-MODULAR REDUNDANT FAULT TOLERANT CLOCK SYSTEM

FIELD OF TECHNOLOGY

This invention generally pertains to a system of redundant clock channels, and particularly, to a fault tolerant clock system that periodically synchronizes the clock channels.

BACKGROUND OF THE INVENTION

The need for safety, low maintenance, and reliability has resulted in the development and use of multiple redundant critical systems in aircraft and aerospace applications. A single backup system is frequently not sufficient where disagreements may exist between two nominally functional systems, since the failed system may not be easily identified. For this reason, a critical system, such as the avionics instrumentation package on an aircraft, may include three or more redundant microprocessors running in parallel. Failure of one microprocessor may be detected by comparison of its output to that of the other microprocessors.

Since each microprocessor in a redundant system requires an accurate time base reference, separate clock channels are normally included for each one. Because the microprocessors operate in parallel and their outputs are synchronously compared in time, it is important that the time bases for the microprocessors be at least periodically synchronized. Faults in any of the clock channels may seriously impact the synchronization of the other redundant clock channels, and thus undermine the operation of the entire redundant microprocessor system.

A clock channel fault may comprise an intermittent connection, a shift in the frequency of one of the clock channels due to environmental effects, or a component failure in the circuitry of one of the clock channels. In the worst case, one of the clock channels may fail completely, effectively terminating operation of the microprocessor to which it is connected as a time base. Clearly, it is desirable that the redundant clock system be able to tolerate a limited number of faults without loss of synchronization of the clock channels that continue to operate properly.

Initially, it might seem a simple matter to accommodate one or more faults in a redundant clock system, since the remaining properly operating clock channels could be used to synchronize the time base signals for the other microprocessors. In fact, the problem and its solution is not trivial, particularly if it is not apparent that one of the redundant clock channels has a fault. In the case where the fault does not represent a catastrophic failure of one clock channel, and thus is not easily detectable, the fault may cause different erroneous signals to be provided to the other clock channels, making their synchronization virtually impossible.

The task of periodically synchronizing the clock channels is thus analogous to the classic exercise in logic known as the Byzantine Generals' Problem. In the Byzantine Generals' Problem, a city is surrounded by the Byzantine Army, separate divisions of which are each controlled by one of N different generals. Communication between the generals is limited to oral messages carried by runners. One or more of the N generals may be a traitor who will attempt to confuse the other generals by sending false messages. In the simple case where there are only three generals, it has been shown that a single traitor can confuse two loyal generals, leading to the theorem that more than two thirds of N generals must be loyal to guarantee that the loyal generals can properly reach agreement on a plan of battle.

By analogy to this classic problem, a single clock channel in which a fault appears can prevent two other clock channels from being correctly synchronized if the fault causes a different time base signal to be conveyed to each of the properly operating clock channels during the attempted synchronization process. Based on this theorem, at least four redundant clock channels are required in a clock system in order to tolerate a single fault.

Others have also recognized that providing a fault tolerant redundant clock system is not trivial. For example, in U.S. Pat. No. 4,239,982, a "Byzantine resilient" clock channel is disclosed that includes $2r+2$ clock sources. Each clock source generates and distributes to the other clock sources a clock signal that is phase locked to derived system clock signal provided by a clock receiver associated with each clock source. The derived system clock signal for each clock receiver represents the consensus clock signals of the other sources. Any clock receiver responsive to any $2r+1$ of the clock sources can derive a correct system clock, even if up to $r$ clock source failures occur. Thus, in this prior art solution to the problem, four clock sources are required to tolerate a single fault in the clock system, consistent with the classical mathematical solution. The present invention achieves Byzantine resilience in a more elegant manner, apparently contradicting the theorem.

SUMMARY OF THE INVENTION

In accordance with the present invention, a fault tolerant clock system comprises a first set of fault containment regions that include a plurality of clock units, all of which produce an output time base signal at nominally the same frequency as the other clock units, while operating in a free running mode. Periodically, the free running mode is interrupted for synchronization of the clock units. Interconnected with the plurality of clock units are a corresponding plurality of isolation ports, which comprise a second set of fault containment regions.

Each clock unit includes a local oscillator and counter means that are connected to the local oscillator. The counter means are operative to produce a sync signal at an interval of time that depends on the frequency of the local oscillator. Also included in each clock unit are first signal select means and second signal select means.

The first signal select means receive the sync signals produced by the counter means of all the clock units and in response to the ith sync signal received, produce a load signal. Load signals from each clock unit are connected to all of the isolation ports. In response to the load signals, each isolation port produces a plurality of corresponding isolated load signals.

The second signal select means are connected to receive the corresponding isolated load signals from all of the isolation ports. Responding to a jth corresponding isolating load signal received, the second signal select means produce an enable signal. The enable signal in each clock unit is connected to the counter means and causes the counter means to initiate the free running mode at substantially the same time for all of the clock units, so that their output time base signals are substantially synchronized.

Each clock unit further includes switch means that are connected to receive the sync signal for that clock unit. In response to the sync signal, during synchronization of the clock units, the switch means disable output of the time base signal from the clock unit. Each clock unit may further comprise a latch that is connected to the local oscillator and is operative to latch the corresponding isolated load signals for transmittal to the counter means, synchronous with the time base signals of the local oscillator.

Up to N simultaneous faults can occur in the clock system without substantially effecting synchronization of the clock units that continue to operate properly, so long as the fault tolerant clock system includes at least 2N+1 clock units. Thus, for example, only three clock units are required to tolerate one fault, apparently contrary to the conclusion of the Byzantine Generals' Problem.

DESCRIPTION OF THE PREFERRED EMBODIMENTS

Figure 1:
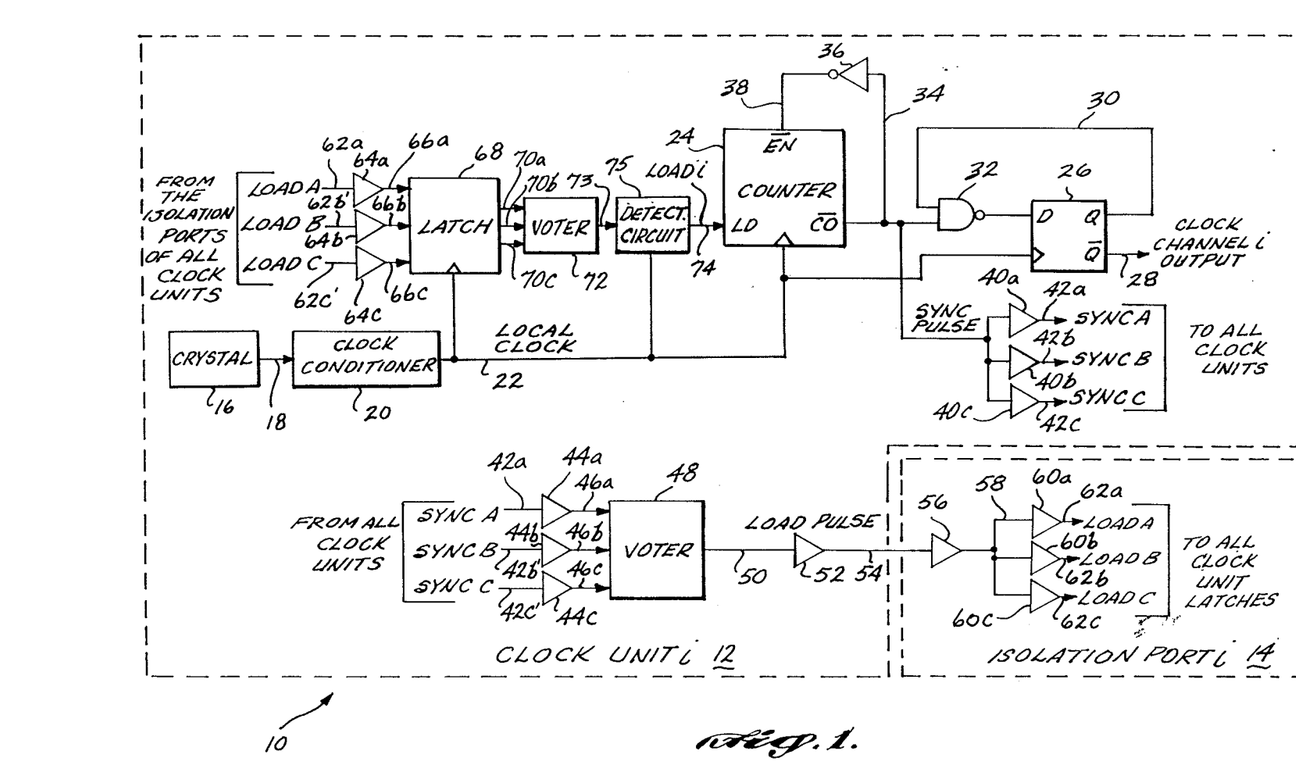
FIG. 1 is a schematic block diagram of a typical clock channel of a fault tolerant clock system.

With reference to FIG. 1, a clock channel 10 is shown that is typical of each clock channel in a fault tolerant clock system including three such clock channels, identified as A, B, and C. Each clock channel includes a clock unit 12 and an isolation port 14. Clock unit 12 comprises a first fault containment region, and isolation port 14 comprises a second fault containment region, making it possible to provide a Byzantine resilient fault tolerant clock system in which a single fault is tolerated, even though only three clock channels (or clock units) are provided. The fault tolerance of the clock system comprising the present invention will be more apparent from the discussion of its operation, which follows the disclosure of the components comprising the system.

The measure of time in each of the clock channels is referenced to a crystal oscillator 16, which produces a pulse output at a desired frequency, establishing a time base for the clock channel that is a function of the period of the signal produced by the crystal oscillator. The signal provided by crystal oscillator 16 is conveyed over a lead 18 to a clock conditioner 20 that divides the clock frequency by a factor of two. Clock conditioner 20 also buffers the clock oscillator signal so that it can drive a greater current load and improves the wave form of the signal. The output pulses of clock conditioner 20, identified as the "local clock" signal, is conveyed through a lead 22 to a counter 24 and to the clock terminal of a D-type flip flop 26. The local clock signal pulses applied to the input of counter 24 accumulate until a predetermined number of the pulses are received.

The local clock signal pulse rate is divided by two through the action of D-type flip flop 26. A clock channel output signal is provided at the $\overline{Q}$ terminal of D-type flip flop 26 over a lead 28, for use in providing a time base for a microprocessor (not shown) or for other time base applications. The output from the Q terminal of the flip flop is connected through a lead 30 to one input of a NAND gate 32, and the output of the NAND gate is connected to the D input terminal of the flip flop. So long as the other input to NAND gate 32 remains high, i.e., at a logic level 1, the clock channel output signal on lead 28 from the flip flop changes between a high and a low state at the receipt of every other positive leading edge of the pulses comprising the local clock signal, which are provided over lead 30; otherwise, the clock channel output signal is disabled. The D-type flip flop thus serves as a switch to control output of the signal on lead 28 in response to the input of NAND gate 32.

A lead 34 connects an NOT carry-out signal, $\overline{CO}$, from counter 24 to NAND gate 32 and to an inverter 36. The output signal from inverter 36 is connected back into the enable port, $\overline{EN}$, of counter 24 through a lead 38. Accordingly, while the carry-out signal from counter 24 is high, the input to the enable port of the counter remains low, permitting the counter to accumulate Nc local clock pulses. Once the $\overline{CO}$ signal changes to a low level, i.e., logic level 0, the clock channel output signal from D-type flip flop 26 is disabled, since the input to the D terminal of the flip flop then remains continuously at a logic level 1, due to the action of NAND gate 32. In addition, when the $\overline{CO}$ signal from counter 24 goes low, the input to the enable port changes to a logic level 1, causing the counter to stop accumulating pulses.

Lead 34 also connects the $\overline{CO}$ signal to three drivers 40a, 40b, and 40c. While counter 24 is accumulating Nc local clock pulses, the $\overline{CO}$ signal remains at a logic level 1 and the output signals from drivers 40 also remain at a logic level 1. However, when the $\overline{CO}$ signal changes to a logic level 0 as the counter accumulates its predetermined number of local clock pulses, a negative going sync pulse is produced on each of leads 42a, 42b, and 42c, respectively, from drivers 40a, 40b, and 40c.

One of the sync pulse signals is applied to each clock unit i. To simplify the explanation, in the preferred embodiment shown in FIG. 1, clock unit i may be considered to be the clock unit for clock channel A of a clock system having clock channels A, B, and C. Accordingly, the sync pulse from driver 40a is connected to a driver 44a through lead 42a. However, sync pulses from the clock units in channels B and C are connected to a driver 44b through a lead 42b' and to a driver 44c through a lead 42c', respectively. It will be apparent that each clock unit is thus connected to receive a sync pulse from its own counter 24 and from the counters on each of the other clock units comprising the system. The output from drivers 44 are conveyed over leads 46a, 46b, and 46c to a voter block 48. Details of the circuitry in voter block 48 are disclosed below.

The output from voter block 48 comprises a load pulse, which is conveyed over a lead 50 to a driver 52. Timing of the load pulse is dependent upon the second sync pulse to be received by voter block 48. For example, if sync pulse A is received, followed in time by sync pulse C, the receipt of sync pulse C causes voter block 48 to produce a load pulse over lead 50. Similarly, if sync pulse B and sync pulse C are received simultaneously ahead of the other sync pulse, voter block 48 responds by immediately producing the load pulse. The load pulse produced by voter block 48 and output from driver 52 is conveyed through a lead 54 to the input of an isolation device 56, which is located in isolation port 14.

A signal output from isolation device 56 is conveyed through leads 58 to each of drivers 60a, 60b, and 60c. These drivers each produce an output signal that is conveyed respectively over leads 62a, 62b, and 62c to a driver 64 on a different one of the clock channels. Referring to the upper left corner of FIG. 1, lead 62a is connected to a driver 64a, whereas a lead 62b' from the channel B isolation port is connected to a driver 64b and a lead 62c' is connected to a driver 64c. The output signals from drivers 64 are input to a latch 68 over leads 66a, 66b, and 66c, respectively. Latch 68 is operative to latch each of the signals when received. The latched signals are output over leads 70a, 70b, and 70c to a voter block 72, with the occurrence of a local clock signal to which the latch is connected to receive via lead 22. Like voter block 48, voter block 72 produces a load i channel output signal as soon as the second latched signal is received. The three load signals that are input to latch 68 are generally not synchronous in time, due to propagation delays within a skew limit (or because of a fault). Any two of the load signals that arrive from the isolation ports of the operating channels within the period of one local clock pulse of the ith channel are latched and simultaneously output to voter block 72 when the next local clock pulse is received by the latch. However, if the isolated load signals that are input to latch 68 arrive at times that differ by more than the period of a local clock signal, they are input separately to voter block 72. The skew limit is always less than the period of the local clock pulse. In any case, voter block 72 responds to the second latched load signal to be received, producing an output signal over a lead 73, which is connected to the input of a detector circuit 75. In response to the output signal of voter block 72, detector circuit 75 produces a load i channel signal that has a pulse width equal to the pulse width of the local clock signal on lead 22. The load i channel signal is input to the load enable port, LD, of counter 24 over a lead 74.

Upon receiving the load i channel signal, counter 24 responds by clearing the carry-out signal (changing it from a logic level 0 to a logic level 1), which causes the counter to resume counting local clock signals until the predetermined number, Nc, of clock signals is again accumulated. In the preferred embodiment, a value for Nc is selected that is between 1,000 and 10,000. Each time that Nc local clock pulses are accumulated by counter 24, the ith channel is again disabled and resynchronized with the other active channels. In this manner, each operating clock channel is synchronized with the other clock channels within the skew limit, so long as no more than one fault occurs in one of the three clock channels.

Although the preferred embodiment uses only three clock channels, it is clearly expandable to encompass additional clock channels. Up to N simultaneous faults may be sustained in the clock system according to the present invention, so long as there are at least $2N+1$ clock channels, without causing the synchronization of the remaining operating clock channels to exceed the skew limit.

Figure 2:
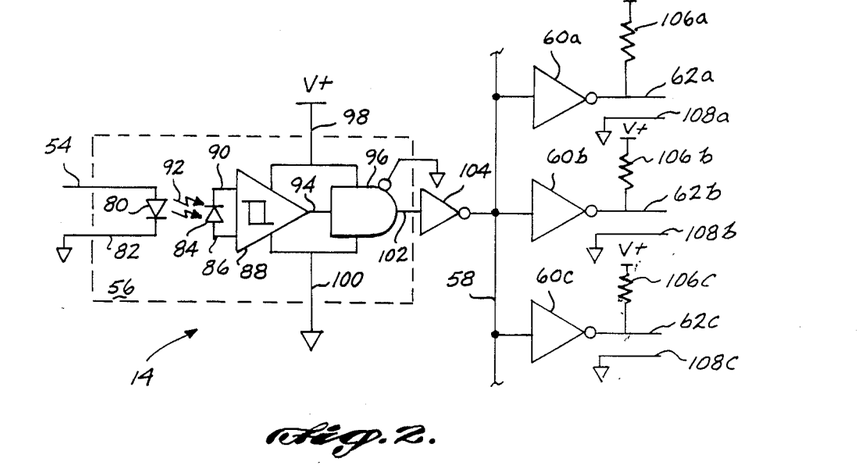
FIG. 2 is a schematic diagram of a typical isolation port used in the fault tolerant clock system.

Turning now to FIG. 2, details of isolation port 14 are shown, again typical of each of the isolation ports for each clock channel in the clock system. As described above, lead 54 provides a load pulse to the isolation port. The load pulse is input to the anode of a light emitting diode (LED) 80, the cathode of the diode being connected to ground through a lead 82. A photodiode 84 detects light (arrows 92) emitted from light emitting diode 80. The anode of photodiode 84 is connected through a lead 86 to one input of a differential amplifier 88, and the cathode of the photodiode is connected to the other input of the differential amplifier through a lead 90. As light from LED 80 falls upon the photodiode, a potential is developed between its anode and cathode that causes the output signal from the differential comparator to change. A lead 94 conveys this signal to a buffer 96. Both diffential amplifier 88 and buffer 96 are connected to an appropriate voltage supply, V+, by a lead 98, and to ground through a lead 100. The output signal from buffer 96 is connected to the input of a driver 104 through a lead 102. The components comprising isolation device 56 as indicated by the dashed line enclosing those components in the figure, i.e., LED 80, photodiode 84, differential amplifier 88, and buffer 96 are provided on any of a number of commercially available integrated circuits.

The output of driver 104 is connected to the inputs of the three drivers 60, which, as shown in FIG. 2, are in fact logic level inverters. Each of leads 62 are connected through a pull-up resistor 106 to the V+ power supply. In addition, each signal conveyed over leads 62 is referenced to ground via leads 108.

Figure 3:
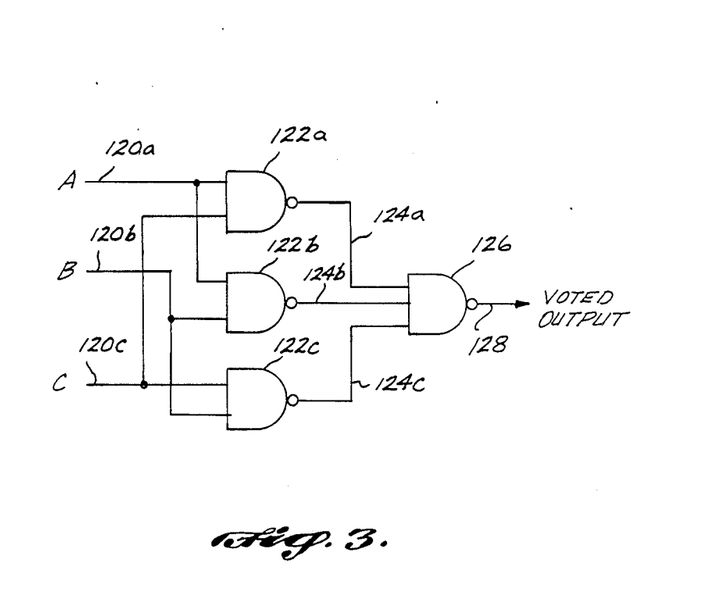
FIG. 3 is a schematic diagram of a typical voter circuit used in the fault tolerant clock system.

Referring to FIG. 3, details of voter blocks 48/72 are shown, typical of the voter blocks used in each clock channel. Either the sync or isolated load pulse (depending on which voter block is involved) is input to NAND gates 122 over leads 120a, 120b, and 120c, respectively. In addition, each NAND gate 122 is connected to receive a pulse from one other of the clock channels. Thus, for example, NAND gate 122a receives the isolated load pulse or sync pulse from channel A over lead 120a and a comparable signal from channel C over lead 120c. Similarly, NAND gate 122b receives pulses from channel A and channel B, while a NAND gate 122c receives pulses from channel B and channel C. The output of NAND gate 122a is connected to one input of a tri-input NAND gate 126 through a lead 124a. Likewise, the outputs of NAND gates 122b and 122c are connected to the other two inputs of tri-input NAND gate 126 through leads 124b and 124c, respectively.

It will be apparent that as soon as any one of the NAND gates is provided with two inputs that are both at logic level 1, the output of that NAND gate will change from a logic level 1 to a logic level 0. Until that condition occurs, all inputs to tri-input NAND gate 126 remain at a logic level 1, causing its output that is connected to a lead 128 to remain at logic level 0. Once any two of the clock channels pulse inputs to NAND gates 122 are equal to logic level 0, the voted output from the voter block changes from a logic level 1 to logic level 0.

Figure 4:
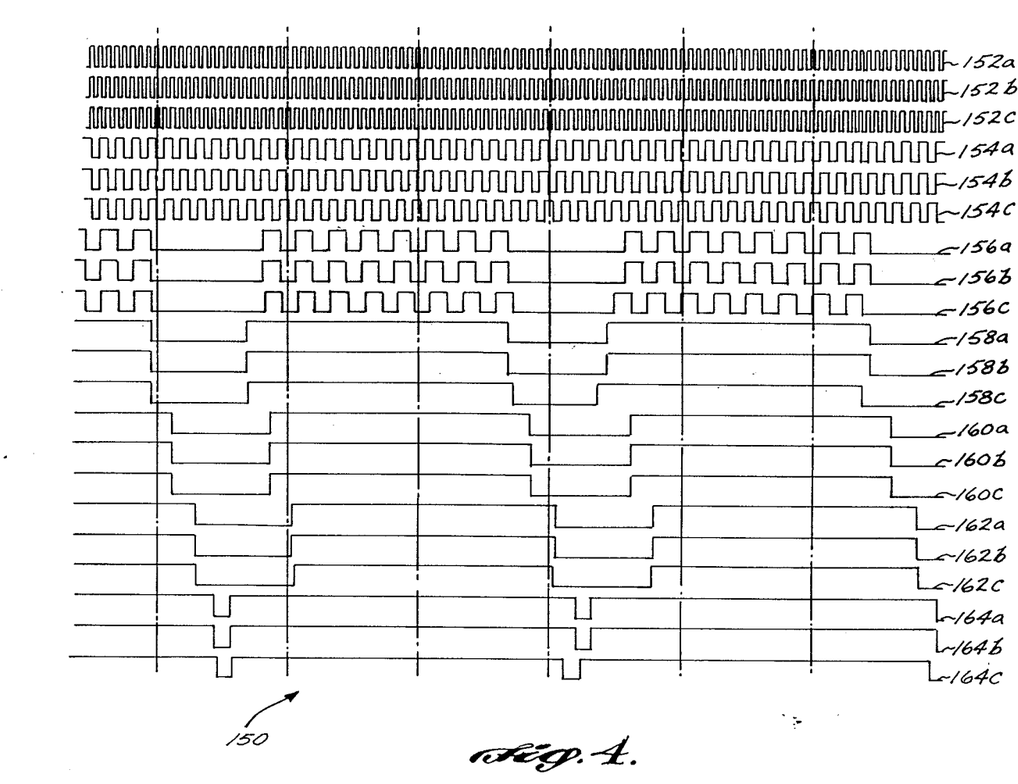
FIG. 4 is a timing chart showing the time relationship of various signals in the fault tolerant clock system.

Operation of the preferred embodiment of the clock system described above is perhaps most easily understood by reference to FIG. 4, which shows the timing relationship of the various signals developed within each clock channel that are used to control synchronization of the clock channels that are operational. FIG. 4 is divided into a plurality of sets of traces taken three at a time, each one of the three traces in any set representing a signal from one of the different clock channels. The signal produced by each crystal oscillator is shown on the top of a timing chart 150, wherein for clock channels A, B, and C, the signals are respectively represented by traces 152a, 152b, and 152c. Accordingly, the letter subscripts on each of the traces shown in timing chart 150 corresponds to the letters (A, B, C) identifying each of the clock channels. The second set of three traces 154 are at one-half the frequency of the crystal oscillator signal, and correspond to the local clock signals for each of the channels. Similarly, the clock channel output signals are represented by traces 156, at approximately one-half the frequency of the local clocks channels, traces 154. As shown in FIG. 4, there is an interruption in each of the clock channel output signals following every 16 pulses of the local clock signal. Since it would be impractical to show the preferred 1,000 to 10,000 clock pulses that are actually accumulated by counters 24 in a free running mode between synchronizations of the clock channels, timing chart 150 has been simplified to show only 16 such pulses as the predetermined number of pulses, Nc, that counters 24 accumulate before initiating clock channel synchronization of clock channel output signals 156.

Traces 158 represent the three sync pulse signals that are input to each voter block 48 in all three clock channels. The $\overline{CO}$ signals produced by counters 24 to disable each clock channel correspond to the sync pulses produced by the clock channels, which are conveyed to voter blocks 48 in all of the clock units. The second sync signal to be received by each voter block 48 causes it to produce a load pulse on lead 50, as illustrated by traces 160. Thus, for example, on the far right side of timing chart 150, it is apparent that the sync signal trace 158b is the second sync pulse signal to arrive at each voter block, and thus controls initiation of all the load pulses produced by voter blocks 48 so that they are simultaneous in time. (See traces 160, at the right side of the timing chart.)

The output of voter block 72 on lead 73 in the different clock channels is shown by traces 162. As with other of the traces illustrated above, the point in time at which traces 162 change from a high value to a low value, or vice versa, depends upon propagation delays in the interconnecting circuitry, which may be slightly different for the components used in each clock channel. Thus, for example, in the middle of FIG. 4, trace 162c changes from its high value to its low value slightly earlier than the voter block output signal traces 162a and 162b.

Finally, the load i channel output signal of each detector circuit 75 for the three clock channels is represented by traces 164. The transition of each trace 164 from a high value to a low value represents the point at which each counter 24 is enabled to again begin counting, and reenables each clock channel output signal, respectively represented by traces 156. Accordingly, after 16 local clock pulses are accumulated by counter 24, in the example shown in timing chart 150, all operating clock channels are synchronized with each other within a skew limit that depends upon signal propagation delays within the circuit and within the components comprising the clock system.

Figure 5:
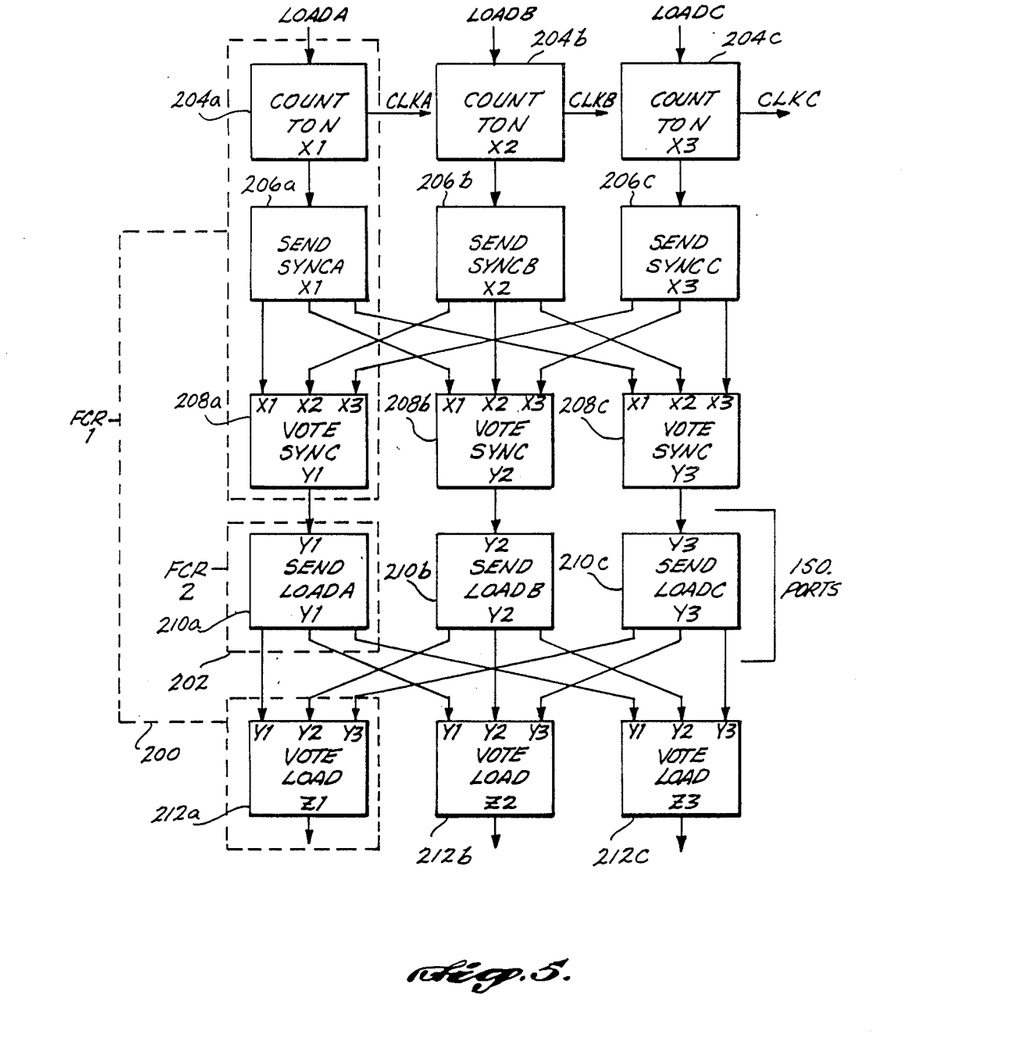
FIG. 5 is a signal flow diagram illustrating the propagation of signals that results in synchronization of three properly operating clock channels.

Fault tolerance of a clock system in accordance with the present invention is schematically illustrated in FIG. 5, wherein a plurality of labeled blocks illustrate the propagation of various signals within each clock channel and between clock channels. For channel A, a first fault containment region 1 is indicated by dash lines 200. It should be noted that fault containment region 1 is divided into two parts, separated by a fault containment region 2, which includes the isolation ports on each clock channel. Fault containment region 1 generally represents all other components of each clock channel, except the isolation port. The second fault containment region is enclosed by dash lines 202. Clock channels B and C are similarly also divided into fault containment regions 1 and 2. Use of the isolation port to prevent faults from propagating between the two voter blocks in each clock channel forms the basis for the Byzantine resilience of the present clock system.

The flow of signals through and between the clock channels begins at the top of FIG. 5, where each of the load A, load B, and load C signals are input to counters 24, causing them to begin counting local clock pulses until the predetermined number, Nc, is reached. While the counters are accumulating local clock pulses, the clock channel output signals, Clk A, Clk B, and Clk C are provided for use as a time base, as noted above. As soon as each counter accumulates Nc local clock pulses, it causes the sync pulse from that clock channel to be replicated, as shown in blocks 206, and voted as indicated in blocks 208. In the lower portion of blocks 206, the sync signals for each channel are generally identified by the letter "X". Each clock channel (A, B, C) is identified by a number, 1 through 3, respectively. Thus, block 206a includes a sync signal identified as X1, which is sent to each of blocks 208a, 208b, and 208c. Since FIG. 5 represents a clock system in which all channels are operating without faults, the sync pulse received by all blocks 208 from block 206a is shown as X1, and thus corresponds to the same sync signal that was sent by block 206a. Similarly, the sync pulses transmitted from blocks 206b and 206c are correctly received at blocks 208 as X2 and X3, respectively.

The second sync pulse signal to be received causes the generation of load pulses identified as Y1, Y2, and Y3 with respect to blocks 208a, 208b, and 208c, respectively. The load pulses produced in blocks 208 are correctly received by each of the isolation ports in blocks 210. Blocks 210 each produce a corresponding isolated load signal Y1, Y2, or Y3, which is supplied to each of a plurality of blocks 212. Blocks 212 provide for voting upon receipt of the second of these signals, producing a corresponding load enable signal. The load enable signals, Z1 through Z3, represent the load A, load B, and load C signals shown at the top of FIG. 5, which synchronize the clock channels for the next cycle of free running operation, while each counter again accumulates Nc local clock pulses. The signals Z1 through Z3 are all within the permissible skew limit, predetermined as a function of the circuit design, lead lengths, and specified propagation delay times for each electrical component of the circuit. So long as no faults exist in the circuit, following each accumulation of Nc local clock pulses by the counters in blocks 204, all three clock channels are synchronized so that their time bases agree to within the skew limit.

Figure 6:
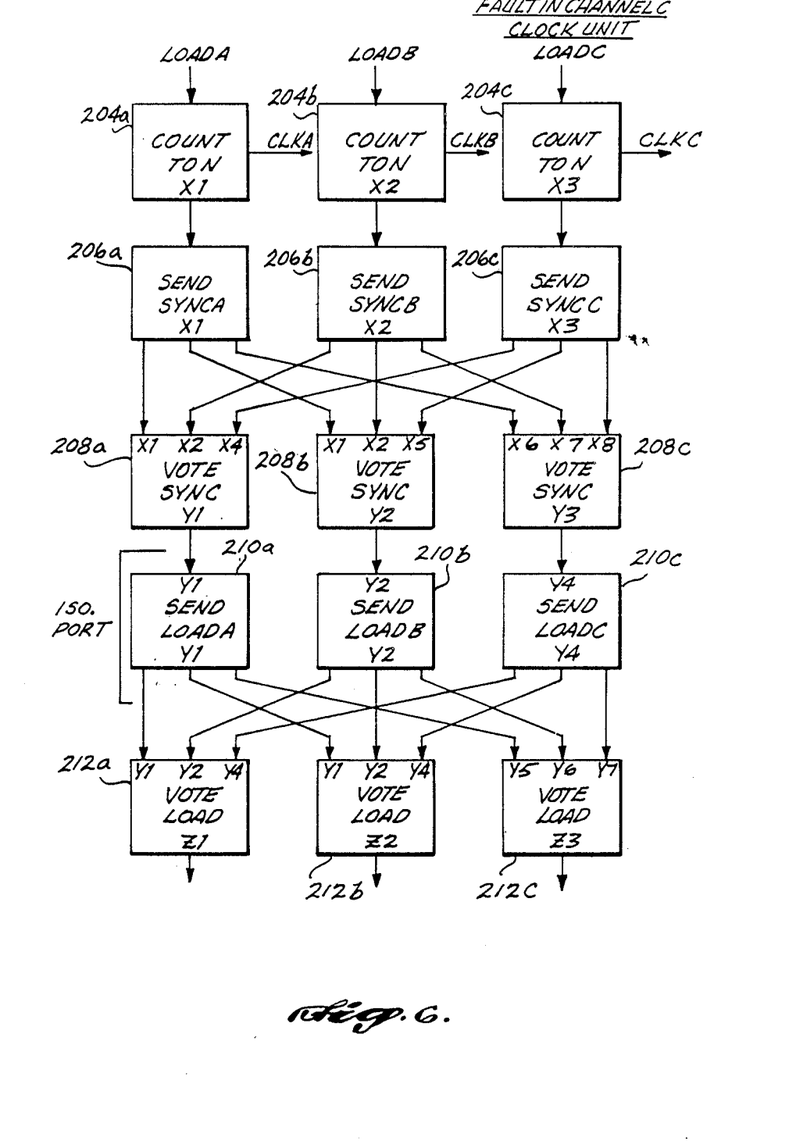
FIG. 6 is a signal flow diagram illustrating how a fault in one of the clock units does not affect synchronization of the clock channels that continue to operate properly.
Figure 7:
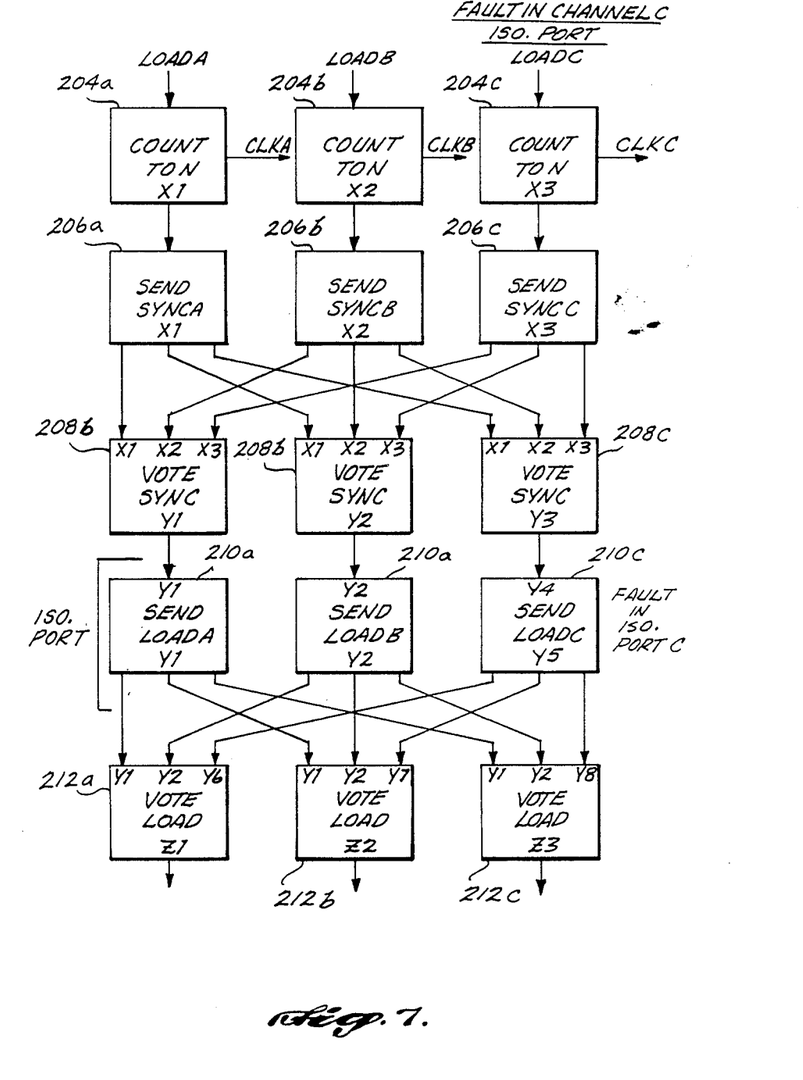
FIG. 7 is a signal flow diagram illustrating how a fault in one of the isolation ports does not affect synchronization of the clock channels that continue to operate properly.

FIGS. 6 and 7 each illustrate the tolerance of the clock system to a fault occurring in clock channel C, with respect to synchronization of the other two operating clock channels A and B. In FIG. 6, the fault may occur anywhere within fault containment region 1, i.e., within the clock unit of clock channel C, whereas in FIG. 7, the fault occurs in fault containment region 2, i.e., within the isolation port. In each of FIGS. 6 and 7, the signals propagating within the clock system are interconnected between the blocks discussed above with respect to FIG. 5; however, because of the fault in channel C, signals may not be correctly received or transmitted between blocks, and thus, are identified by a different letter/number combination, where an error may have occured.

Focusing initially on FIG. 6, the first point at which a fault in the channel C clock unit may cause erroneous signals to occur is represented in respect to the signals received in blocks 208. Although the signal output from blocks 206 are exactly the same as shown in FIG. 5, wherein no fault is present, in FIG. 6, the X3 sync pulses from channel C may be in error or may be transmitted incorrectly to the other channels, and thus, are identified at the top of blocks 208a, 208b, and 208c as X4, X5, and X8, respectively. An intermittent connection in the leads that convey the sync pulses X3 to each of voter blocks 48 could cause these sync pulses to arrive at different times (or not at all) at each of blocks 208.

In the example illustrated in FIG. 6, channels A and B are presumed to be operating correctly, so that sync pulses X1 and X2 differ in time by no more than the skew limit of the clock system. Since sync pulses X1 and X2 both arrive properly at blocks 208a and 208b, the voted load pulse Y1 and Y2 should differ by no more than the amount of the skew between X1 and X2, even in the worse case condition where X4 arrives at the same time as X1, and X5 arrives at the same time as X2. Thus, it will be apparent that either X1 or X2 controls when load pulses Y1 and Y2 are produced in blocks 208a and 208b, and that load pulses Y1 and Y2 occur within the skew limit. Since a fault may exist within block 208c, it is possible that sync pulses X1 and X2 may be either improperly received or improperly voted, and thus they are shown in block 208c as X6 and X7, respectively. The same problem may exist with respect to sync pulse X3, and thus it is represented as X8.

In the isolation ports, blocks 210, the correct isolated load pulse signals Y1 and Y2 are transmitted to blocks 212a and 212b. However, although isolation port, block 210c properly transmits a corresponding isolated load signal Y4 to blocks 212a and 212b, the isolated load signal that is received by block 212c may be incorrect, since a fault may exist within the voter block or within the leads connecting the isolation port to the voter block. Similarly, isolated load pulses Y1 and Y2 may be incorrectly received in block 212c, and thus are represented by Y5 and Y6, respectively.

The isolated load pulse Y4 cannot be trusted as an accurate timing signal, and in fact may be entirely absent. In any case, blocks 212a and 212b receive isolated load pulses Y1 and Y2, which differ by no more than the skew limit, and in response, produce load enable signals Z1 and Z2. The load enable signals Z1 and Z2 are synchronous in time within the skew limit, since in both blocks 212a and 212b, the same pulse (either Y1, Y2, or Y4) which is the second signal to be received causes the load enable signal Z1 and Z2 to be produced. In block 212c, however, the load enable signal Z3 cannot be trusted, since the load pulses Y5, Y6, and Y7 may be erroneous. Clock channels A and B are nevertheless accurately synchronized with each other within the skew limit, even though a fault in channel C renders it potentially unusable.

Turning now to FIG. 7, a fault is assumed to exist in the isolation port of channel C, at block 210c. This fault may cause a load pulse Y3 to be improperly received as a load pulse Y4, and may cause an erroneous isolated load pulse Y5 to be produced, or improperly transmitted to each of the blocks 212a, 212b, and 212c. Since all blocks 212 receive load pulses Y1 and Y2, which are within the skew limit, load enable signals Z1, Z2, and Z3 cannot differ from each other by any more than the skew limit, irrespective of when load pulses Y6, Y7, and Y8 are received by each of blocks 212. As a result, all clock channels are synchronized within the skew limit, even though a fault exists in fault containment region 2, the isolation port of channel C. The above explanation of fault tolerance with respect to FIGS. 6 and 7 applies equally to a fault in channel A or B.

The preferred embodiment can be expanded to more than three clock channels in a relatively straightforward fashion, as should be apparent to one of ordinary skill in the art. At least five clock channels are required to sustain two simultaneous faults in the clock system, either in fault containment region 1 or fault containment region 2 of different clock channels, while still continuing to synchronize the clock channels that continue to operate properly. As additional clock channels are provided, it is preferable for voter blocks 48 and 72 in each channel to respond to a third sync pulse or load pulse to be received, rather than the second such pulse.

While the present invention has been disclosed with respect to a preferred embodiment and modifications thereto, those of ordinary skill in the art will appreciate that further modifications may be made to the invention within the scope of the claims that follow. Accordingly, it is not intended that the invention in any way be limited by the disclosure, but instead that its scope be determined entirely by reference to the claims.

The embodiments of the invention in which an exclusive property or privilege is claimed are defined as follows:

1. A fault tolerant clock system, comprising:
   a. a plurality of clocks, each producing time signals;
   b. a plurality of counters, each connected to a different one of the plurality of clocks so as to receive the time signals produced thereby, each of the plurality of counters being operative to produce a sync signal that disables an output signal from said different one of the plurality of clocks to which it is connected, after counting a predetermined number of said time signals;
   c. a plurality of first signal select circuits, each connected to receive the sync signals from all of the plurality of counters, and each being operative to produce a load signal in response to the order in which the sync signals are received;
   d. a plurality of isolation ports, each connected to receive the load signal from one of the first signal select circuits, and operative to produce a plurality of corresponding isolated load signals; and
   e. a plurality of second signal select circuits, each connected to receive one of the corresponding isolated load signals from each of the plurality of isolation ports, each second signal select circuit being operative to produce an enable signal in response to the order in which the corresponding isolated load signals are received, each of the plurality of counters being connected to receive the enable signal produced by a different one of the plurality of second signal select circuits and caused thereby to begin counting the time signals, enabling the output signal of said one clock to which the counter is connected at substantially the same time as others of the plurality of counters respectively enable the output signals of the other clocks, so that all of the plurality of clocks are substantially synchronized.

2. The fault tolerant clock system of claim 1, wherein each of the plurality of first signal select circuits is operative to produce the load signal in response to receiving a sync signal that is received after or at the same time as a first sync signal to be received.

3. The fault tolerant clock system of claim 1, wherein each of the plurality of second signal select circuits is operative to produce the enable signal in response to receiving a corresponding isolated load signal that is received after or at the same time as a first corresponding isolated load signal to be received.

4. The fault tolerant clock system of claim 1, wherein up to N simultaneous faults may occur in the fault tolerant system without significantly affecting synchronization of all clocks that continue to operate properly, so long as the fault tolerant system includes at least $2N+1$ clocks, N being a real integer.

5. The fault tolerant clock system of claim 1, wherein each of the plurality of second signal select circuits includes a latch connected to receive the corresponding isolated load signals and operative to latch said load signals.

6. A fault tolerant clock system, comprising:
   a. a plurality of oscillators, each producing a time base signal;
   b. control means, connected to receive the time base signal of each oscillator, for periodically producing a plurality of control signals, each of said control signals separately interrupting an output of the time base signal from a different one of the plurality of oscillators, wherein a time interval between successive control signals for each oscillator is respectively a function of the frequency of the time base signal produced by the oscillator;
   c. first voter means, connected to receive the control signals from the control means, for separately selecting one of the control signals to initiate a load signal for each of the oscillators;
   d. isolation means, connected to receive the load signals from the first voter means, for buffering the load signals and producing a separate set of corresponding isolated load signals from each load signal; and
   e. second voter means, connected to receive one of the corresponding isolated load signals from each set, for selecting one of said signals for each oscillator, to initiate an enable signal for that oscillator, each of said enable signals being connected to the control means and substantially synchronized in time, said control means being further operative to enable the output of each time base signal in response to the enable signals so that time base signals produced by the plurality of oscillators are substantially synchronized within a skew limit.

7. The fault tolerant clock system of claim 6, wherein the control means comprise a plurality of counters, each of which is connected to receive the time base signal of a different one of the oscillators, and each of which is loaded with a predetermined number and initialized by one of the enable signals to count periods of the time base signal produced by one of the oscillators, equal to the predetermined number.

8. The fault tolerant clock system of claim 7, wherein the counters each produce one of the plurality of control signals after counting the predetermined number of periods of the time base signal produced by said one of the oscillators to which the counter is connected.

9. The fault tolerant clock system of claim 8, wherein the control means further comprise switch means for interrupting the output of the time base signal from each oscillator in response to the control signal from the counter.

10. The fault tolerant clock system of claim 9, wherein the control signals from the counters are each connected to a logic circuit that enables output of the time base signal from one of the oscillators, unless disabled by the control signal.

11. The fault tolerant clock system of claim 6, wherein up to N simultaneous faults may occur within the fault tolerant system without affecting the synchronization of the output time base signals from oscillators that continue to operate properly, so long as the fault tolerant clock system includes at least $2N+1$ oscillators, N being a real integer.

12. The fault tolerant clock system of claim 6, wherein the first voter means are operative to separately initiate the load signal for each oscillator by selecting a control signal received after or at the same time as a first control signal to be received.

13. The fault tolerant clock system of claim 6, wherein the second voter means are operative to separately initiate the enable signals for each oscillator by selecting a corresponding isolated load signal received after or at the same time as a first corresponding isolated load signal to be received.

14. The fault tolerant clock system of claim 6, wherein the isolation means comprise a plurality of optical isolators and drivers.

15. The fault tolerant clock system of claim 6, wherein the first and the second voter means each comprise a logic circuit that is triggered to produce an output signal in response to receiving a second input signal.

16. A fault tolerant clock system, comprising:
   a. a first set of fault containment regions, including a plurality of interconnected clock units, all clock units producing an output time base signal at nominally the same frequency while operating in a free running mode, said free running mode being periodically interrupted for synchronization of the clock units;
   b. a second set of fault containment regions, including a plurality of isolation ports, each isolation port corresponding to one of said clock units and interconnected with said plurality of clock units;
   c. each of said clock units comprising:
      i. a local oscillator;
      ii. counter means, connected to the local oscillator, for periodically producing a sync signal at an interval of time that depends on the frequency of the local oscillator;
      iii. first signal select means, connected to receive the sync signals produced by the counter means of all the clock units, for producing a load signal in response to an ith sync signal received, where the ith sync signal is not a first sync signal received, each of said isolation ports receiving the load signal from the clock unit to which it corresponds and being operative to produce a plurality of corresponding isolated load signals in response to that load signal; and iv. second signal select means, connected to receive the corresponding isolated load signals from all of the isolation ports, for producing an enable signal in response to a jth corresponding isolated load signal received, where the jth corresponding isolated load signal is not a first corresponding isolated load signal received, said enable signal being connected to the counter means and causing the counter means to initiate the free running mode at substantially the same time for all of the clock units, so that the output time base signals of all properly operating clock units are substantially synchronized, at least within a skew limit.

17. The fault tolerant clock system of claim 16, wherein each clock unit further comprises switch means, connected to receive the sync signal for that clock unit, for disabling output of the time base signal during synchronization of the clock unit in response to the sync signal.

18. The fault tolerant clock system of claim 16, wherein up to N simultaneous faults can occur without substantially affecting synchronization of the clock units that are operating properly, so long as the fault tolerant clock system includes at least 2N +1 clock units, N being a real integer.

19. The fault tolerant clock system of claim 16, wherein each clock unit further comprises a latch that is connected to the local oscillator of the clock unit and which is operative to latch the corresponding isolated load signals for transmittal to the counter means, sychronous with the time base signals of the local oscillator.

20. A method for synchronizing a plurality of clocks channels in a time base system that is fault tolerant, comprising the steps of:

a. periodically producing a sync signal for each clock channel after a clock in the clock channel has run for an interval of time that is determined as a function of a time base frequency of the clock channel;
b. disabling an output signal from each clock channel in response to its sync signal;
c. selecting one of the sync signals to initiate a load signal for each clock channel;
d. producing a set of isolated load signals corresponding to the load signal of each clock channel;
e. selecting one of the isolated load signals from the set to initiate an enable signal for each clock channel, all of said enable signals being substantially sychronous in time;
f. enabling the output signal from each clock channel in response to the enable signal, so that the output signals of all of the clock channels are substantially synchronized.

21. The method of claim 20, further comprising the step of loading a counter with a predetermined number and initiating the counting of the predetermined number of clock cycles for each of the clocks, thereby determining the intervals between sync signals.

22. The method of claim 20, wherein the step of selecting one of the sync signals comprises the step of selecting a sync signal received after or at the same time as a first sync signal to be received.

23. The method of claim 20, wherein the step of selecting one of the isolated load signals comprises the step of selecting an isolated load signal received after or at the same time as a first isolated load signal to be received.

24. The method of claim 20, wherein up to N simultaneous faults in the time base system can be tolerated without substantially affecting the synchronization of the clock channels that continue to operate properly, so long as the time base system includes at least 2N +1 clock channels, N being a real integer.

25. The method of claim 20, further comprising the step of latching the set of isolated load signals prior to the step of selecting one of the isolated load signals.

* * * * *

UNITED STATES PATENT AND TRADEMARK OFFICE
CERTIFICATE OF CORRECTION

PATENT NO. : 4,979,191

DATED : December 18, 1990

INVENTOR(S) : Bond et al.

It is certified that error appears in the above-identified patent and that said Letters Patent is hereby corrected as shown below:

| Column | Line(s) | |
|---|---|---|
| 2 | 20 | After the word "to" insert the word --a-- |
| 2 | 56 | "ith" should be --*ith*-- |
| 2 | 63 | "jth" should be --*jth*-- |
| 4 | 51 | "i" should be --*i*-- |
| 4 | 52 | "i" should be --*i*-- |
| 5 | 28 | "i" should be --*i*-- |
| 5 | 34 | "ith" should be --*ith*-- |
| 5 | 46 | "i" should be --*i*-- |
| 5 | 48 | "i" should be --*i*-- |
| 5 | 51 | "i" should be --*i*-- |
| 5 | 59 | "ith" should be --*ith*-- |
| 6 | 21 | "diffential" should be --differential-- |
| 7 | 17 | "clocks" should be --clock-- |
| 7 | 56 | "i" should be --*i*-- |

UNITED STATES PATENT AND TRADEMARK OFFICE
CERTIFICATE OF CORRECTION

PATENT NO. : 4,979,191

DATED : December 18, 1990

INVENTOR(S) : Bond et al.

Page 2 of 2

It is certified that error appears in the above-identified patent and that said Letters Patent is hereby corrected as shown below:

| Column | Line(s) | |
|---|---|---|
| 9 | 12 | "occured" should be --occurred-- |
| 10 | 24 | "two" should be --two-- |
| 12 | 66 | "ith" should be --*ith*-- |
| 12 | 67 | "ith" should be --*ith*-- |
| 13 | 8 | "jth" should be --*jth*-- |
| 13 | 9 | "jth" should be --*jth*-- |
| 13 | 36-37 | "sychronous" should be --synchronous-- |

Signed and Sealed this

Twenty-sixth Day of November, 1991

*Attest:*

HARRY F. MANBECK, JR.

*Attesting Officer*      *Commissioner of Patents and Trademarks*